United States Patent [19]

Lange

[11] 4,376,574
[45] Mar. 15, 1983

[54] CAMERA WITH ELECTRONICALLY CONTROLLED SHUTTER AND FLASH TRIGGERING ASSEMBLY

[75] Inventor: Karl-Heinz Lange, Bunde, Fed. Rep. of Germany

[73] Assignee: Balda-Werke Photographische Gerate und Kunststoff GmbH & Co., KG, Bunde, Fed. Rep. of Germany

[21] Appl. No.: 299,419

[22] Filed: Sep. 4, 1981

[30] Foreign Application Priority Data

Sep. 5, 1980 [DE] Fed. Rep. of Germany ....... 3033453

[51] Int. Cl.³ .............................................. G03B 15/03
[52] U.S. Cl. .................................................... 354/147
[58] Field of Search ............... 354/126, 129, 133, 137, 354/138, 139, 145, 147, 149, 187, 230

[56] References Cited

U.S. PATENT DOCUMENTS 3,906,525 9/1975 Ettischer ............................. 354/149
4,065,779 12/1977 Lange ............................. 354/126 X Primary Examiner—John Gonzales
Attorney, Agent, or Firm—Blum, Kaplan, Friedman, Silberman & Beran

[57] ABSTRACT

A camera including an electronically programmed shutter including improved switches closed during operation of the shutter is provided. The shutter assembly includes an opening member and a locking member carrying shutter blade pivotably mounted to the opening member. Actuation of the opening member triggers closing of the switch which closes the current circuit to an electronic flash device at a maximum predetermined lens opening and initiates the shutter closing. The switches are closed by displacement of a transfer member which is positioned in the locus of movement of the opening member. The position of the transfer member may be set by a switch in the flash device through a linking flash slide or may be changed in response to rotation of the camera focusing element.

13 Claims, 2 Drawing Figures

CAMERA WITH ELECTRONICALLY CONTROLLED SHUTTER AND FLASH TRIGGERING ASSEMBLY

BACKGROUND OF THE INVENTION

This invention relates to cameras having a programmed shutter, and particularly to cameras having a programmed shutter with at least one switch member in an electrical circuit closed by operation of the opening member of the shutter assembly.

In cameras of this type there is generally selected a fixed programmed exposure value for a flash setting. For example, 1/60 seconds exposure is generally utilized in combination with a predetermined lens opening. Flash ignition is triggered by release of the shutter. Since the electrical circuit works simultaneously with the triggering without interruption, a delaying circuit must be provided in the flash device so that the flash discharge does not occur immediately upon releasing the shutter, but after a period of delay. Such a delaying circuit is essential in prior art units. Such units are not fully satisfactory as including such a delaying circuit represents additional expenditure during construction and assembly of the camera. In addition, if one wishes to discharge the flash at different programmed exposure values, it would be necessary to provide a specialized delaying circuit for each such programmed setting. This latter feature would result in yet higher costs of assembly.

In the known cameras including a programmed shutter, the existing light conditions are not measured upon activation of the flash. A predetermined shutter exposure is communicated to the shutter program over a fixed resistor, for example, 1/60 seconds. In a programmed shutter assembly, this exposure time is coupled with a corresponding lens opening for the shutter opening of 1/60 seconds.

In addition to the requirement of a delaying circuit, setting a predetermined shutter time with a fixed resistor is costly. This is the case because the time-measuring photo-electric elements which are usually utilized in measuring daylight exposures without a flash cannot be utilized. Thus, the prior art cameras require incurring double expenses. On the one hand, the delaying circuit must be included and, on the other hand, a circuit for providing the predetermined shutter-time values must also be included.

German Patent Specification DE-AS No. 17 72 768 teaches discharge of the flash during opening of the lens shutter at a time dependent upon the distance setting so that the effective lens opening varies depending on the distance. Herein, the time of discharge is adjusted by a mechanism wherein changing the distance setting on the camera changes the position of a contact piece. During the course of the opening movement of the lens, the current circuit for the flash is closed through physical contact. In this solution, the mechanical parts and mountings and bearing supports must be of utmost precision, since minimal deviation and tolerances will adversely effect the relatively short path between the electrical contacts which are adjustable in response to a change in the distance setting of the camera. Wear and tear to such mechanical parts and the force they are subjected to, as well as dust accumulation adversely effect operation of this type of construction.

In this type of construction, adjusting of the time of the shutter opening depends on the intensity of the light supplied by the flash. The shutter reacts far too slowly to operate with sufficient percision. Accordingly, in practice, the solution proposed by DE-AS No. 17 72 768 cannot be utilized because adjusting of the discharge time, which lies fully within the range of a few milliseconds cannot be sufficiently effected by mechanical displaced elements. In these known mechanical solutions, in most cases, the flash has delivered its discharge of light before the flash-cycle can be interrupted by mechanical means. In other words, these solutions generally provide over-illumination.

A further disadvantage of the known solutions utilizing delaying circuits is illustrated by DA-AS No. 20 08 124. It should be pointed out that the delaying circuits proposed in these publications presuppose that in order for them to function smoothly, that during the entire life time of the camera as well as that of the flash device that the mechanical and electrical elements will run fully synchronized fashion. As a practical matter, such is not the case.

Accordingly, it is desirable to provide a camera including switch mechanisms which overcome the disadvantages of the known arrangements and provide a camera having a programmed shutter with a flash device which will overcome the shortcomings of the prior art. Further it is desirable to provide a camera wherein flash discharge will occur at attainment of a predetermined lens opening, which will depend upon the distance setting. In such a solution, flash discharge is to occur simultaneously with the start of the closing of the opened programmed shutter.

SUMMARY OF THE INVENTION

A camera with an electronically variable programmed shutter including three shutter blades pivotably mounted on a shutter locking ring is provided. A concentrically mounted opening ring includes pins extending through elongated slots in each shutter blade for opening and closing the shutter blades in response to rotation of the tensioned concentric rings in response to activation of the shutter release button.

The shutter assembly includes a transfer member which is selectively placed into the locus of the rotating opening ring when a flash unit is mounted to the camera body. Upon rotation of the shutter opening ring to the maximum shutter opening, the transfer member closes a first electrical switch for closing the current circuit to the flash unit and immediately thereafter closing a second switch for deenergizing an electromagnet holding the locking or shutter ring in its original cocked position. As the first switch is closed the flash is discharged and as the second switch is closed, an electromagnet holding the locking ring is deenergized and releases the locking ring for closing the shutter at the instant of flash discharge. The shutter assembly also includes a flash slide which places the transfer member in the locus of the opening ring when the flash is mounted on the camera. The transfer member is displaced by different positions of the opening ring when the flash is set for varying lens openings, the different positions on the opening ring corresponding to the lens openings.

Accordingly, it is an object of the invention to provide an improved camera shutter assembly.

It is another object of the invention to provide an improved shutter assembly for a camera including an electronically adjustable programmed shutter.

Still another object of the invention is to provide an improved assembly for regulating flash discharge at the maximum lens opening.

Still a further object of the invention is to provide an improved shutter assembly wherein shutter closing begins at the instant of flash discharge.

Yet another object of the invention is to provide a shutter assembly including an improved switch mechanism activated at preselected lens openings.

Yet a further object of the invention is to provide an improved shutter assembly wherein a flash current circuit is closed in response to a shutter opening member reaching a preselected maximum opening selected by the distance setting of the camera.

It is another object of the invention to provide a camera shutter assembly which insures steady and secure shutter operation.

It another object of the invention to provide a shutter assembly wherein a flash circuit is closed avoiding problems of synchronization.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DISCRIPTION OF THE DRAWINGS

For a fuller understanding of the invention, reference is had to the following description taken in connection with the accompanying drawings, in which:

FIG. 1 is an elevational view in schematic illustrating a shutter assembly including a transfer mechanism and switch assembly constructed and arranged in accordance with an embodiment of the invention; and FIG. 2 is an elevational schematic representation of a shutter opening ring, distance setting ring and transfer element constructed and arranged in accordance with another embodiment of the invention.

DESCRIPTION OF THE PREFERRED EMBODIMENTS

Figure 1:
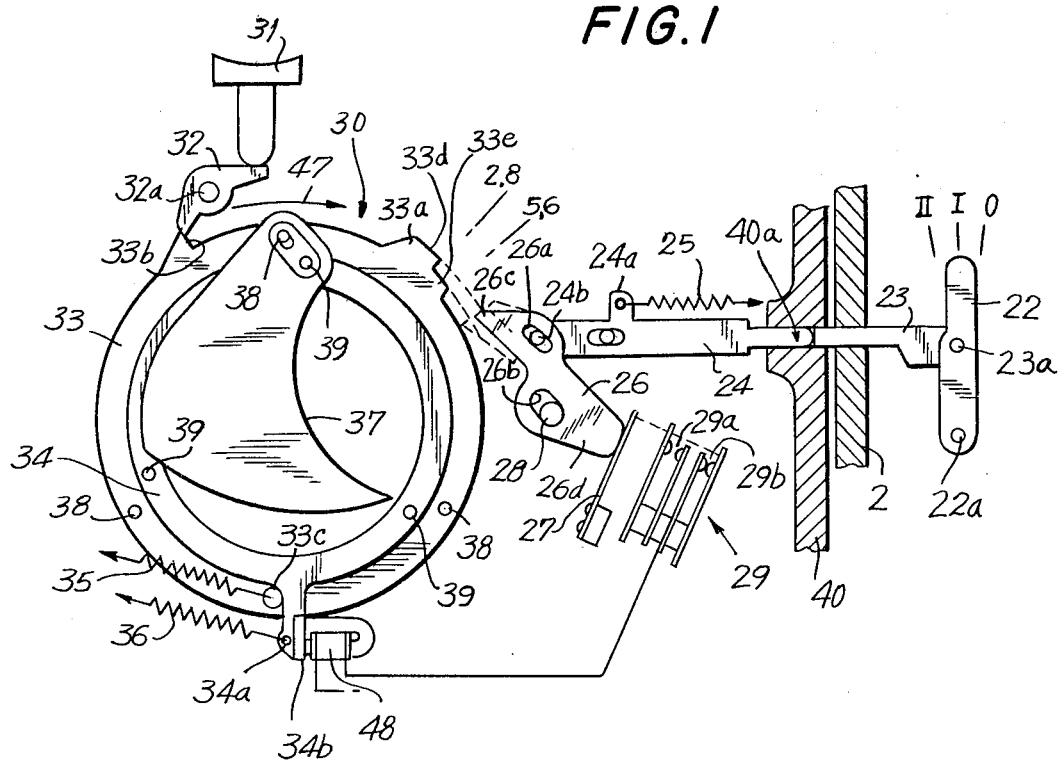

An electronically controlled programmed shutter 30 in accordance with the invention includes an opening ring 33 including three pins 38 equidistantly spaced over the surface thereof. Pins 38 ride in elongated openings 37a of three corresponding shutter blades 37, only one of which is illustrated in FIG. 1. Shutter blades 37 are oscillatably mounted on three pivot pins 39 equidistantly distributed over the surface of a locking ring 34. A tension spring 35 is mounted to shutter opening ring 33 and biases ring in a clockwise direction. Opening ring 33 is formed with a nose region 33b which is biased against a release pawl 32 pivotably mounted by a pin 32a. A shutter release button 31 is mounted through the camera body (not shown, but only a wall 40 is shown) and releases release pawl 32 from engagement with nose 32b and, under the tension from spring 35 opening ring 33 rotates in the clockwise direction of an arrow 47.

FIG. 1 further shows locking ring 34 bearing pins 39, on which shutter blades 37 are oscillatably mounted. Locking ring 34 includes an anchor arm 34a on which is mounted a tension spring 36 for biasing locking ring 34 also in the clockwise direction of arrow 47. Anchor arm 34a also includes a magnetic anchor disk or plate 34b which is in contact with an electric holding magnet 48.

Locking ring 34 is secured in the cocked position shown in FIG. 1 and can only oscillate in the clockwise direction of arrow 47 after a tensioning pin 33c on opening ring 33 has freed the rotational path of locking ring 34 at anchor arm 34a and holding magnet 48 has been neutralized so that anchor plate 34b is released from magnetic traction therefrom.

Opening ring 33 is formed with a tongue or lug 33a having at least two steps which lie on different radii. An outer step 33d is designated as "2.8" is recessed in relationship to an inner step 33e which is designated as "5.6". The designations "2.8" and "5.6" indicate that these two steps are related to the corresponding "f-stop" values given to the lens opening.

A flash device having an outer shell 2 is shown mounted adjacent to wall 40 of the camera compartment. The flash device includes an oscillatable lever 22 pivotably mounted at a pin 22a and including three positions, marked "0", "I" and "II". In position "0" the flash device is turned off. In position "I" the flash device is designed to discharge at a lens opening of f.2.8 and in position "II" the flash device is set to discharge at a lens opening of f.5.6. Lever 22 is pivotably mounted within the flash device 2 by a pin 22a and operatively coupled to a tappet 23 by a pin 23a. Thus, lever 22 pivots between its various positions in response to horizontal displacement of tappet 23. When flash device 2 is mounted on the camera body tappet 23 abutts an elongated flash slide 24 within camera compartment 40. Flash slide 24 includes an arm 24a on which is mounted a restoring spring 25 which biases slide 24 to outer wall 40 and tappet 23 through an opening 40a in wall 40.

The interior end (towards the left in FIG. 1) of flash slide 24 is linked to a transfer member 26 by a pin 24b mounted in a first slot 26a in transfer member 26. Displacement of transfer member 26 is guided by means of a stationary support pin 28 mounted through a second slot 26b. Transfer member 26 is maintained in the shutter-cocked position shown in FIG. 1 by a leaf spring 27 mounted within camera compartment 40. Positioned between leaf spring 27 and wall 40 is a set of contacts of a switch assembly indicated generally as 29. Only a portion of contacts 29 is shown which is sufficient for description of the mechanical contact in accordance with the invention. Contacts 29 includes a synchronized contact 29a for closing a current circuit (not shown) to the flash device for discharge of the flash device and an interrupting contact 29b for initiation of the shutter closing upon discharge of the flash device.

Having described the elements of the shutter assembly and auxiliary flash device of FIG. 1, closing of the shutter upon discharge of the flash and placing the flash in an off condition will now be described. In the following description, flash device 2 has been mounted to wall 40 and set from the OFF position "0" to the "I" position for a discharge at a lens opening of f2.8. Shutter 30 is released by depressing shutter release button 31 which pivots release pawl 32 out of engagement with nose 33b on opening ring 33 which rotates in a counter-clockwise direction of arrow 47. As opening ring 33 rotates, lug 33a at step 33d designated as "2.8" reaches free end 26c of transfer member 26. Upon further rotation of opening ring 33, transfer member 26 is displaced towards switch assembly 29 and contact end 26d overcomes the force of leaf spring 27 and closes flash contact 29a which closes the current circuit to flash 2 for discharging flash device 2 at the instant of the largest lens opening. As transfer member 26 continues its displacement, interrupting contact 29b is opened thereby interrupting the current supplied to electromagnet 48. As electromagnet 48 is de-energized it is demagnetized and plate 34b of anchor arm 34a on locking ring 34 is released from magnetic engagement with electromagnet 48. Locking ring 34 rotates in counter-clockwise direction of arrow 47 as tensioning pin 33c has been displaced from engagement with anchoring arm 34a. Shutter 30 then closes independently of the timing device of the camera.

When the flash device has been set at position II corresponding to a lens opening of "5.6", the two respective switching steps occur in similar fashion. When lever 22 is displaced to the left at position II to correspond to the f5.6 lens aperature setting, tappet 23 is displaced towards the left so that flash slide 24 places free end 26c of transfer member 26 within the locus of step 33e of opening ring 33 at the "5.6" designation. Transfer member 26 is displaced towards switch member 29 in the same manner as when flash device is set at I for a lens opening of "2.8". At this time, interrupting contact 29b is activated when the lens aperature reaches the maximum f5.6 lens opening. Again, flash discharge occurs at the instant of maximum lens opening, in this case, a lens opening designated as "5.6".

Figure 2:
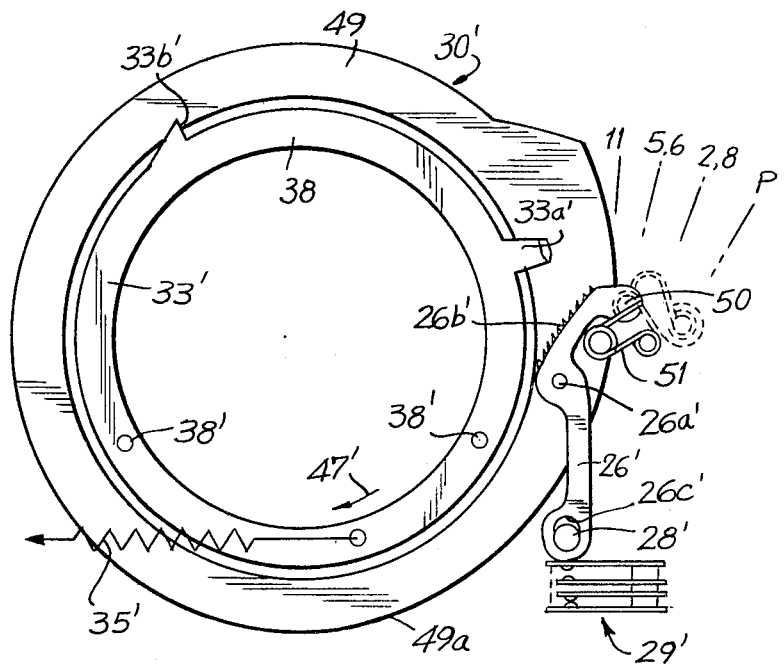

FIG. 2 illustrates another embodiment of a shutter assembly constructed and arranged in accordance with the invention. Elements which act in similar fashion are designated with the same reference numerals as in FIG. 1, supplemented by a "prime" designation. The embodiment of FIG. 2 does not illustrate the locking ring nor the shutter blades. A distance setting ring 49 is shown concentrically mounted with opening ring 33'. A transfer member 26' is oscillatably mounted at its lower end in an elongated opening 26'c on stationary support pin 28'. Transfer member 26' carries a tracer finger 50 at its upper end which engages a cam surface 49a on distance setting ring 49. Tracer finger 50 is always maintained in contact with cam surface 49a by an Omega spring 51.

In this embodiment, the value of the lens opening has been attributed to each oscillating position of the upper end of transfer member 26. Thus, the lens values of f11, f5.6 and f2.8 have been illustrated in FIG. 2. The upper end of transfer member 26' may also be oscillated in the counter-clockwise direction from its contact position by providing an element (not shown) which engages joint pin 26a' for drawing transfer member 26' to the extreme right position. When this movement occurs, the "over dead point spring action" of Omega spring 51 leads to a displacement of the upper end into the position marked by a dotted line where tracer finger 50 no longer abutts cam surface 49a in camming fashion. This position occurs when the flash unit is not in use and is designated "P".

Transfer member 26' is drawn to this P position in the same manner as transfer member 26 is drawn to the off position "Zero" as shown in FIG. 1 and described above. In this embodiment of FIG. 2, joint pin 26a' draws transfer member 26' to the right in the same manner as first slot 26a in transfer member 26 is engaged by pin 24b on flash slide 24 in the embodiment of FIG. 1. In other words, when the flash is not mounted on the camera body, transfer member 26' is biased to the off position as is transfer member 26 in FIG. 1.

Opening ring 33' includes a lug 33a' which upon rotation of opening ring 33 in clockwise direction of arrow 47' engages a toothed region 26b' of transfer member 26'. When lug 33a' engages tooth region 26b', transfer member 26' is displaced in a downward direction so that first contact 29a' of switch member 29' is closed for discharging the flash at the desired maximum lens opening. Thus, as in connection with the description of the embodiment illustrated in FIG. 1, the flash unit is discharged at the maximum opening of the lens. Upon further displacement of transfer member 26' on stationary support pin 28' due to rotation of opening ring 33, second contact 29b' is opened releasing the magnetic engagement between the electromagnet and the locking ring (as described and shown in connection with FIG. 1) so that closing of the shutter occurs immediately following discharge of the flash unit. Also shown for the embodiment of FIG. 1, the point of impact for impingement of lug 33a' and transfer member 26' depends on the oscillating position of transfer member 26' which is set by adjustment of the distance setting ring which displaces transfer member 26 as tracer finger 50 follows camming surface 49a. Thus, adjustment of the shutter is effected in the same manner as described in connection with the embodiment of FIG. 1.

By constructing and arranging a shutter assembly in accordance with the invention, displacement of the transfer member at maximum lens opening triggers a switch for discharge of the flash when placed in an on position. Immediately following discharge of the flash, opening of a second switch member releases the shutter locking ring thereby closing the shutter immediately upon discharge of the flash. By constructing and arranging the shutter assembly in this manner, synchronization problems encountered in the prior art are efficiently overcome.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A camera having an electronically programmed shutter, wherein the shutter is operated by displacing an opening member for opening the shutter blades and rotating a closing member for closing the shutter blades, the camera adapted to receive an electronic flash device, comprising:

a projecting region formed on the opening member having at least one detent corresponding to a value of a lens opening;

switch means including circuit interruption means for releasing the shutter locking ring to initiate closing of the shutter;

a transfer member disposed between the opening member and the switch means, said transfer member displaceable into the locus of displacement of the at least one detent when the flash is mounted on the camera for displacing the transfer member towards the switch means upon contact by the detent on the rotating opening member for displacing the transfer member into contact with the switch means upon the shutter opening to the maximum lens opening, said switch means initiating rotation of the locking member for closing the shutter.

2. The camera of claim 1, wherein said switch means includes electromagnetic means engaging said locking ring and holding said locking member in a shutter tensioned position until interruption of current to said electromagnetic means at maximum lens opening for initiation of closing of said shutter.

3. The camera of claim 1, wherein said switch means further includes flash switch means for closing a current circuit to an attached electronic flash device for discharging the device.

4. The camera of claim 3, wherein the transfer member is selectively positionable within the locus of displacement of the opening member with respect to varying lens opening values.

5. The camera of claim 3, wherein the transfer member is selectively positionable within the locus of displacement of the opening member corresponding to various settings on the flash device.

6. The camera of claim 3, wherein the transfer member is selectively positionable within the locus of displacement of the opening member corresponding to the distance setting of the camera.

7. The camera of claim 3, wherein the opening member is an opening ring and the locking member is a locking ring, the projecting region formed on the opening ring having at least two stepped region corresponding to different diameters corresponding to different lens settings, the transfer member being an oscillatably mounted lever displaceable by the stepped regions of the opening ring for contacting the switch mechanism at the maximum opening corresponding to the preselected lens value.

8. The camera of claim 3, wherein the opening member is an opening ring and the locking member is a locking ring and further including a stop region formed on the peripheral surface of the opening ring, said transfer member having an engagement region, said projection on the opening ring adapted to engage the engagement region of the transfer member at different positions on the engagement region of the transfer member corresponding to the value of predetermined different lens openings.

9. The camera of claim 8, further including a distance setting ring concentrically mounted with said opening ring, the peripheral surface of said distance setting ring including a cammed region corresponding to values of different lens openings, the transfer member including a tracer finger engaging the camming surface for adjusting the position of the transfer member in response to rotation of the distance ring so that a different position of the engagement surface of the transfer member will be contacted by the projection on the opening ring corresponding to the distance setting.

10. The camera of claim 3, further including slide means for selectively positioning the transfer member in a predetermined position in the locus of the stepped regions of the rotating opening ring.

11. The camera of claim 10, wherein the slide means is engaged to a flash device mounted on said camera, the slide means displacing the transfer member in response to adjustment of the flash device.

12. The camera of claim 11, wherein adjustment of the flash device corresponds to the lens opening.

13. The camera of claim 3, wherein the opening member is formed with at least two stepped regions corresponding to two different lens opening values.

* * * * *